W. P. FIREY.
EMERGENCY POWER DEVICE.
APPLICATION FILED JUNE 22, 1915.
1,218,847.
Patented Mar. 13, 1917.
2 SHEETS—SHEET 1.
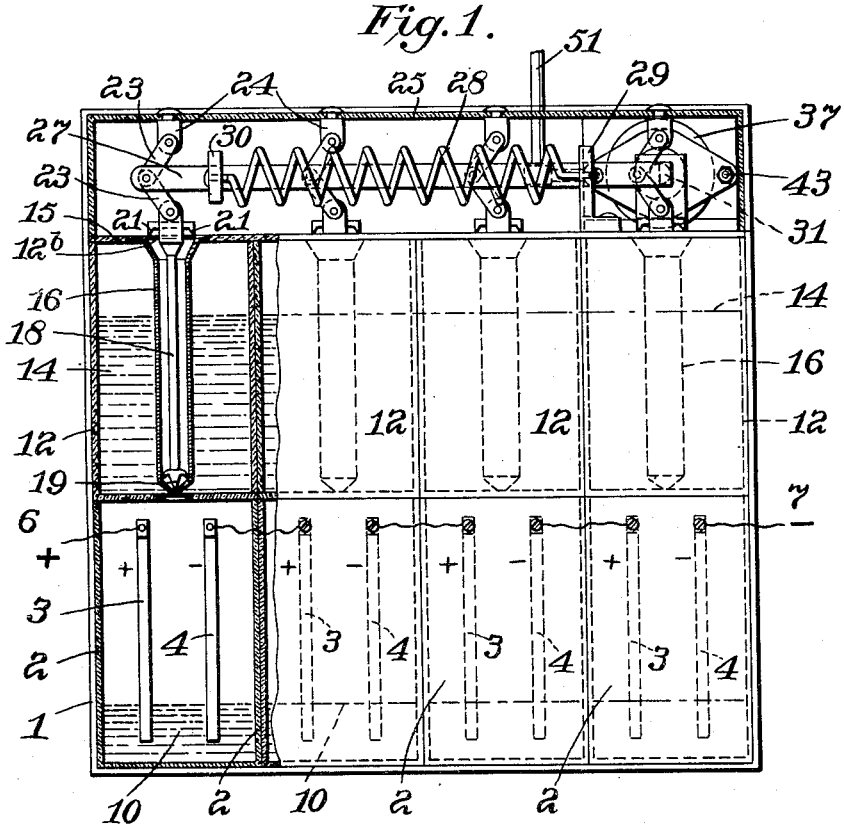
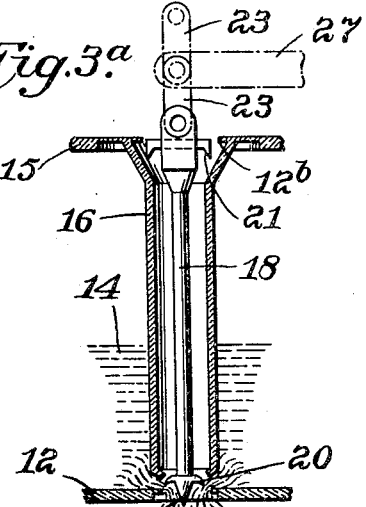
Inventor:
William Payson Firey,
by Eugene C. Brown
Atty.

W. P. FIREY.
EMERGENCY POWER DEVICE.
APPLICATION FILED JUNE 22, 1915.
1,218,847.  Patented Mar. 13, 1917.
2 SHEETS—SHEET 2.
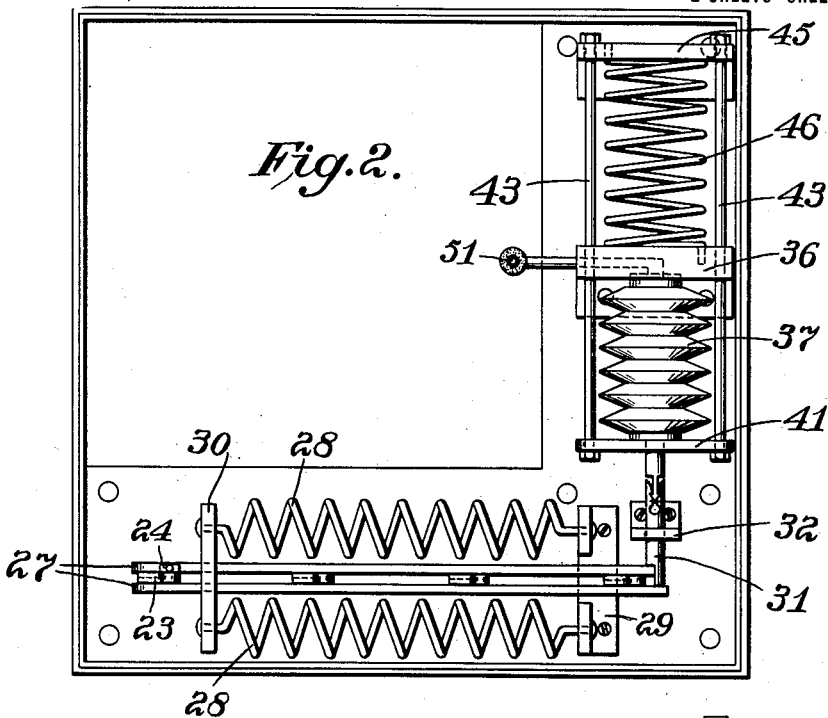
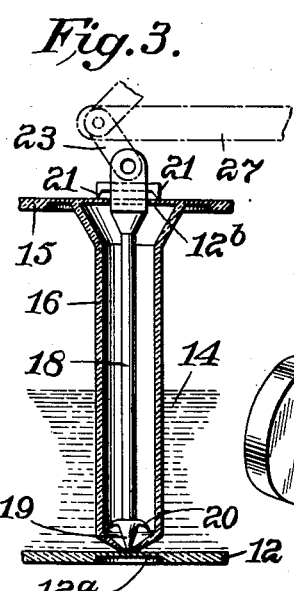
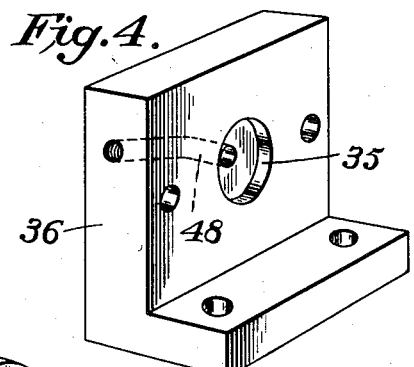
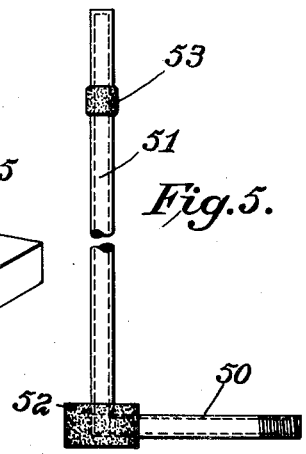
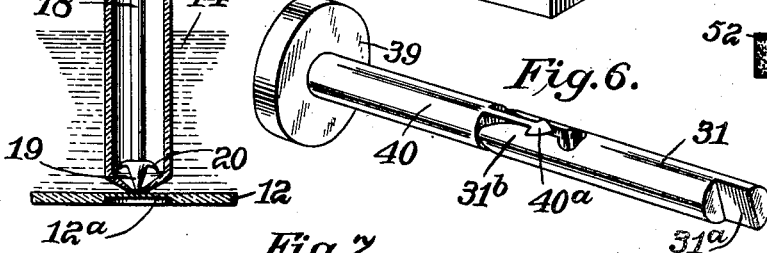
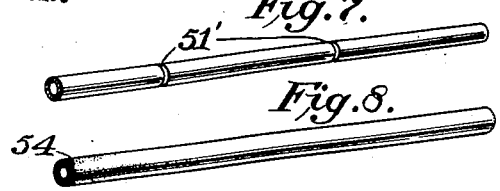
Inventor:
William Payson Firey,
by Eugene C. Brown
Atty.

UNITED STATES PATENT OFFICE.

WILLIAM PAYSON FIREY, OF ROANOKE, VIRGINIA.

EMERGENCY POWER DEVICE.

1,218,847.  Specification of Letters Patent.  Patented Mar. 13, 1917.

Application filed June 22, 1915. Serial No. 35,707.

*To all whom it may concern:*

Be it known that I, WILLIAM PAYSON FIREY, a citizen of the United States, residing at Roanoke, in the county of Roanoke and State of Virginia, have invented certain new and useful Improvements in Emergency Power Devices, of which the following is a specification.

My invention relates to apparatus for generating electric energy, means for automatically charging said apparatus with an electrolyte and means for controlling said charging operation when actuated by outside influences, such as a fire, earthquake, or other causes effecting a change in the material conditions to which the controlling means is subjected.

The main object of my invention is to provide generating apparatus for supplying electric energy to alarm or other electrically controlled or actuated apparatus, which may be idle or dormant for an indefinite period and yet which is at all times in a condition to respond instantly when a change is effected upon the controlling device.

In the accompanying drawings, Figure 1 is a side elevation, partly in section of an apparatus embodying my invention; Fig. 2 is a top plan view thereof with upper cover plate and attached lugs removed; Figs. 3 and 3ª are vertical sectional views of the plunger and its casing or inclosing tube; and Figs. 4 to 8 inclusive are enlarged views of the detailed parts hereinafter described.

The electric generator preferably consists of a number of battery cells 2 which are arranged side by side and may conveniently be contained in an outer casing 1. These cells contain the positive and negative plates 3, 4 respectively which are provided with binding posts or other connecting means by which they may be connected in any desired manner to the terminals 6, 7 of an electric circuit which supplies energy to the alarm or other electrically controlled or actuated mechanism. The cells may also contain a quantity of depolarizer 10, inasmuch as such substances are normally inert and do not affect the battery plates.

Directly over each of the battery cells are placed corresponding vessels 12 containing a suitable electrolyte 14. The upper ends of these containers are closed by a plate or plates 15 of any suitable material and from which depend tubular members 16, which may be either integral with said plates 15 or secured to the lower surface thereof in any suitable manner. Within each tube 16 is a plunger 18 which is provided with a pointed lower end 19 having lateral spikes or pointed lugs 20, the upper end of the plunger being guided through an opening in the plate 15 and to the lower link of a toggle member 23. The upper end of the plunger is also provided with lateral pointed lugs 21 which are clearly located above the plate 15. The several toggle members 23 are pivoted to supports 24 which depend from the upper cover plate 25 and may be riveted thereto as indicated. A pair of operating bars 27 are pivotally connected to the central pins of the several toggle members 23. A pair of springs 28 secured at one end to the bifurcated standard 29 and at the opposite free ends to the cross-bar 30 which is rigidly attached to the bars 27, exert a spring pressure which normally tends to move the bars 27 toward the right and thereby straighten the toggle members 23. When the parts are set or adjusted into the position indicated in Figs. 1 and 2, the bars 27 are pressed toward the left into the position shown, thereby placing the springs 28 under tension and the parts are held in this manner by sliding the stop member 31 through the guide standard 32 until the notched end 31ª bears at the end against the outer bar 27, while the inner bar 27 rests in the cutaway part of the notched end.

For the purpose of withdrawing the stop pin 31 and allowing the springs 28 to actuate the toggle members and the plungers connected therewith, I provide a releasing mechanism clearly shown in the top plan view in Fig. 2. Secured at one end in the recess 35 of the fixed standard or column 36, is a bellows device 37 which clearly tends to collapse by its own elasticity. The opposite end of the bellows 37 is secured to the disk-heat 39 of the trigger pin 40 which projects through an aperture in the cross-head 41 and is provided with an arrow-shaped end 40ª which is adapted to spread apart the notched spring lugs 31ᵇ at the inner end of the stop pin 31 and thereby automatically lock the pin 31 and trigger 40 together. The cross-head 41 is connected by bolts 43 with a sliding standard 45 between which and the central rigid pillar or standard 36 is interposed a spring 46.

In order to inflate the bellows member 37 and maintain it under fluid pressure, I connect the opened end which is secured in the central recess 35, by means of a channel 48 passing through the body of the pillar 36 and in the outer end thereof I secure by a threaded connection or otherwise a tube 50 to which is secured the fragile, fusible or otherwise destructible member which controls the automatic operation of my apparatus.

In Fig. 5 I have shown a tubular member 51 connected to the tube 50 by means of a fusible cell 52, the tube 51 being also provided at 53 with a perforation which is sealed by solder or other fusible material. It is obvious that the fusible or fragile controlling member may be made in various ways, as, for instance, by providing a tube with certain parts which are fragile or made fusible by the connecting means such as bismuth solder or other suitable material. Again I may employ a fusible tube which is surrounded by a combustible coating 54, as illustrated in Fig. 8.

It is to be understood that the controlling tubular member 51 may be of any desired length and may be carried to distant parts of a building, ship, warehouse, or other structure which is to be protected.

The operation of my apparatus will be understood from the foregoing detailed description. After the bars 27 with their connected toggles 23 have been forced toward the left, thereby placing the springs 28 under tension and have been locked in this position by sliding the stop-pin 31 into the position shown in Fig. 2, as previously described, air, gas or other fluid is injected through the tubular members 50 and 51 until the bellows 37 has been inflated, thereby forcing the trigger 40 into locked engagement with the stop-pin 31 and simultaneously placing a slight compression tension on the spring 46, the controlling tube 51 is sealed or otherwise closed to maintain said fluid or pneumatic pressure in the bellows 37.

The parts will remain in this set condition, ready for instant action, for an indefinite period unless some external condition relieves the fluid pressure within the bellows 37. If, however, any of the fusible parts of the control tube 51 are fused, melted or otherwise destroyed by fire or the action of heat, or if any of the fragile parts thereof are broken, as by the shifting of the cargo in a vessel or by the shifting of the goods or supplies in a building from any cause whatever, the fluid pressure in the bellows 37 will be thereby relieved by the immediate escape or outer passage of the contained fluid. Instantly therefore, the elasticity of the bellows will cause it to collapse, this action being assisted by the spring 46 which was placed under compression and this action withdraws the stop pin 31 from the ends of the bars 27 and thus permits the springs 28 to shift the bars and toggles toward the right hand, and thereby force the plungers downwardly with a hammer action sufficient to cause the spikes or pointed lugs 19, 20 and 21 to rupture the thin walls at the lower end of the tubes 16 and the thin portions 12$^a$ and 12$^b$ in the bottom and top walls of the vessels 12 directly below and above the tubes 16. The rupture of these parts by the plungers 18 permits the electrolyte 14 in the several vessels 12 to pass down into the respective battery cells 2 in the manner indicated in Fig. 3$^a$. The electrolyte passes quickly from the upper vessels into the lower cells because the escaping air is vented through the tubes 16. These several operations follow very quickly in succession, so that scarcely a moment lapses between the vent of the control tube 51 and the channel of the electric current in the batteries connected with the alarm or indicator circuits.

It will be obvious to engineers that various changes may be made without departing from the spirit of my invention and within the scope of my claims. Thus it is not absolutely essential that the spring 46 should be used as the apparatus is operative by means of the contraction of the bellows alone. Again the gas or other fluid pressure may be of an explosive nature to thereby hasten the escape of the fluid and quickly relieve the fluid pressure. Other advantages will suggest themselves to those skilled in the art.

I claim:—

1. An apparatus for automatically supplying an electric current upon a change in external conditions, comprising a battery cell having normally inert elements, an electrolytic supply separated therefrom by a barrier or separating medium, means for disrupting said barrier and permitting the electrolyte to flow into said cell, a fluid-actuated device normally restraining said disrupting means, and a destructible element controlling the operation of said fluid-actuated device.

2. An apparatus for automatically supplying an electric current upon a change in external conditions, comprising a battery cell having normally inert elements, an electrolytic supply separated therefrom by a barrier or separating medium, means for disrupting said barrier and permitting the electrolyte to flow into said cell, and a destructible element controlling the operation of said disrupting means.

3. An apparatus for automatically supplying an electric current to a circuit connected therewith, when subjected to a change in external conditions, comprising a battery cell containing normally inert electrodes or elements, a superposed vessel containing an electrolyte and the bottom wall thereof constituting the separating medium between said cell and said vessel, a disrupting device adapted to rupture said wall, means for restraining the operation of said device, and controlling means operable by a change in external conditions adapted to release said disrupting device when affected by said conditions.

4. An apparatus for automatically supplying an electric current to a circuit connected therewith, when subjected to a change in external conditions, comprising a battery cell containing normally inert electrodes or elements, a superposed vessel containing an electrolyte and the bottom wall thereof constituting the separating medium between said cell and said vessel, a plunger operable within said vessel to disrupt said wall, means for normally holding said plunger in retracted position, and control mechanism adapted to release said holding means when affected by a change in external conditions.

5. An apparatus for automatically supplying an electric current to a circuit connected therewith when subjected to a change in external conditions, comprising a battery cell containing normally inert electrodes or elements, a superposed vessel containing an electrolyte and the bottom wall thereof constituting the separating medium between said cell and said vessel, a plunger operable within said vessel to disrupt said wall, means for normally holding said plunger in retracted position, including a fluid-controlled element, and means subject to external conditions for disturbing the static condition of said fluid-controlled element.

6. An apparatus for automatically supplying an electric current to a circuit connected therewith when subjected to a change in external conditions, comprising a battery cell containing normally inert electrodes or elements, a superposed vessel containing an electrolyte and the bottom wall thereof constituting the separating medium between said cell and said vessel, a tubular member having a closed lower end within said vessel, a plunger operable within said vessel, a plunger operable within said vessel to disrupt said tubular member and said wall, a spring actuated toggle connected to said plunger, mechanism for normally holding said toggle in retracted position, and means controlling the operation of said mechanism operable by a change in external conditions.

7. An apparatus for automatically supplying an electric current to a circuit connected therewith when subjected to a change in external conditions, comprising a battery cell containing normally inert electrodes or elements, a superposed vessel containing an electrolyte and the bottom wall thereof constituting the separating medium between said cell and said vessel, a plunger operable within said vessel to disrupt said wall to thereby permit the electrolyte to flow into said cell, a spring actuated toggle member connected to said plunger, a retractile device for holding said toggle member in retracted position when inflated by fluid pressure, and controlling means for disturbing the static condition of said fluid pressure when subjected to a predetermined change in external conditions.

WILLIAM PAYSON FIREY.

Witnesses:
Ross Harvey,
Louise F. Showalter,